United States Patent
Young et al.

(10) Patent No.: US 12,206,658 B2
(45) Date of Patent: Jan. 21, 2025

(54) SYSTEM AND METHOD FOR SECURED SHIPMENT VERIFICATION AND COMPONENT FORENSIC TRACKING

(71) Applicant: Dell Products L.P., Round Rock, TX (US)

(72) Inventors: Jason Matthew Young, Round Rock, TX (US); A. Anis Ahmed, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 659 days.

(21) Appl. No.: 17/452,592

(22) Filed: Oct. 28, 2021

(65) Prior Publication Data
US 2023/0136418 A1 May 4, 2023

(51) Int. Cl.
*G06F 21/00* (2013.01)
*H04L 9/40* (2022.01)

(52) U.S. Cl.
CPC ...... *H04L 63/0823* (2013.01); *H04L 63/0414* (2013.01); *H04L 63/20* (2013.01)

(58) Field of Classification Search
CPC .. H04L 63/0823; H04L 63/0414; H04L 63/20
See application file for complete search history.

(56) References Cited

U.S. PATENT DOCUMENTS

| | | | | |
|---|---|---|---|---|
| 11,397,823 B1* | 7/2022 | Argenti | ................. | G06Q 30/01 |
| 2003/0074294 A1* | 4/2003 | Merkin | ................. | G06Q 30/06 |
| | | | | 705/36 R |
| 2004/0003243 A1* | 1/2004 | Fehr | ...................... | B62D 65/00 |
| | | | | 713/168 |
| 2004/0205327 A1* | 10/2004 | Morrison | ................ | H04L 67/02 |
| | | | | 713/1 |

(Continued)

OTHER PUBLICATIONS

Ragib Hasan et al., Preventing History Forgery with Secure Provenance, Dec. 14, 2009, ACM, vol. 5, Issue 4, pp. 1-43. (Year: 2009).*

(Continued)

*Primary Examiner* — Kari L Schmidt
*Assistant Examiner* — Fahimeh Mohammadi
(74) *Attorney, Agent, or Firm* — McDermott Will & Emery LLP

(57) ABSTRACT

A system for verifying unique components are installed in an end user information handling system comprises a manufacturing facility collecting component information into a data structure, encrypting the data structure, creating a secured component verification (SCV) certificate, signing the SCV certificate and communicating the SCV certificate to a repository, the repository storing the signed SCV certificate. A copy of the signed SCV certificate is saved onto the information handling system. When the information handling system is delivered, the copy of the SCV certificate is compared with the SCV certificate stored in the repository. If they match, the information handling system is verified. If (Continued)

a unique component is replaced, a delta certificate is created and stored with the original SCV certificate in the repository such that all changes to unique components in the information handling system are tracked.

14 Claims, 4 Drawing Sheets

(56) References Cited

U.S. PATENT DOCUMENTS

| | | | | |
|---|---|---|---|---|
| 2012/0308003 | A1* | 12/2012 | Mukherjee | H04L 9/3247 380/243 |
| 2014/0359303 | A1* | 12/2014 | Berke | G06F 21/572 713/189 |
| 2015/0222621 | A1* | 8/2015 | Baum | H04L 63/0807 726/9 |
| 2018/0268146 | A1* | 9/2018 | Suryanarayana | G06F 21/445 |
| 2018/0336554 | A1* | 11/2018 | Trotter | H04L 63/0853 |
| 2019/0158270 | A1* | 5/2019 | Berti | G06F 21/30 |
| 2019/0340269 | A1* | 11/2019 | Biernat | H04L 63/12 |
| 2020/0142739 | A1* | 5/2020 | Chan | G06F 9/50 |
| 2021/0152545 | A1* | 5/2021 | Park | H04L 9/3268 |
| 2022/0248221 | A1* | 8/2022 | Nix | H04W 12/02 |
| 2022/0255762 | A1* | 8/2022 | Dal Zotto | H04L 9/3239 |

OTHER PUBLICATIONS

Qing Hu et al., Ship identity authentication security model based on Blockchain, Sep. 28, 2021, ACM, pp. 135-142. (Year: 2021).*

Kai Fischer et al., Secure identifiers and initial credential bootstrapping for IoT@Work, Sep. 10, 2012, IEEE, pp. 781-786. (Year: 2012).*

Kai Fischer et al., Security Architecture Elements for IoT enabled Automation Networks, Mar. 28, 2013, IEEE, pp. 1-8. (Year: 2013).*

* cited by examiner

SYSTEM AND METHOD FOR SECURED SHIPMENT VERIFICATION AND COMPONENT FORENSIC TRACKING

BACKGROUND

Field of the Disclosure

This disclosure relates generally to information handling systems and, more particularly, to systems and methods for secured shipment verification and component part forensic tracking over the service life of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system has many components, some of which may be covered under service contracts or warranties. To provide a warranty and protect against unintentional or unauthorized claims against a warranty, these components may have a serial number or other unique identifier to identify the component, wherein the unique information is compared against information in a warranty claim to validate the warranty claim.

SUMMARY

Embodiments disclosed herein may be generally directed to information handling systems and systems and methods for secured shipment verification and component part forensic tracking.

Embodiments may be directed to a method for verification of unique components installed in an end user information handling system. The method comprises collecting a component identifier for each unique component installed in the end user information handling system, recording each component identifier for each unique component in a data structure, the data structure further comprising an information handling system identifier, encrypting the data structure, creating a secured component verification (SCV) certificate including the encrypted data structure, signing the SCV certificate, storing the signed SCV certificate in a repository, saving a copy of the signed SCV certificate on the end user information handling system, and verifying unique components installed in the end user information handling system matches unique components installed in the end user information handling system. Verifying comprises the end user information handling system communicating the saved copy of the signed SCV certificate to the repository and the repository determining the signed SCV certificate received from the end user information handling system matches the copy of the signed SCV certificate stored in the repository.

In some embodiments, the saved copy of the signed SCV certificate is stored in a remote access controller in the end user information handling system.

In some embodiments, collecting a component identifier for each unique component installed in the end user information handling system comprises scanning a label on each unique component at a step in the manufacturing process in which the unique component is installed.

In some embodiments, the data structure comprises an information handling system identifier corresponding to the end user information handling system in which the unique component is installed.

In some embodiments, the SCV certificate comprises an X.509 certificate.

In some embodiments, the method further comprises creating a delta certificate when a unique component is installed or removed from the end user information handling system.

In some embodiments, creating a delta certificate comprises a support facility information handling system collecting a component identifier for each unique component to be installed in the end user information handling system and recording the component identifier for each unique component in a secondary data structure and the repository information handling system receiving the secondary data structure, encrypting the secondary data structure, creating a delta certificate including the encrypted secondary data structure, signing the delta certificate, storing the signed delta certificate, communicating a copy of the signed delta certificate to the end user information handling system.

In other embodiments, creating a delta certificate comprises creating a delta certificate comprises a technician information handling system collecting a component identifier for each unique component to be installed in the end user information handling system, collecting a component identifier for each unique component to be removed from the end user information handling system and recording the component identifier for each unique component to be installed or removed in a secondary data structure, and the repository information handling system receiving the secondary data structure, encrypting the secondary data structure, creating a delta certificate including the encrypted secondary data structure, signing the delta certificate, storing the signed delta certificate, communicating a copy of the signed delta certificate to the end user information handling system.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
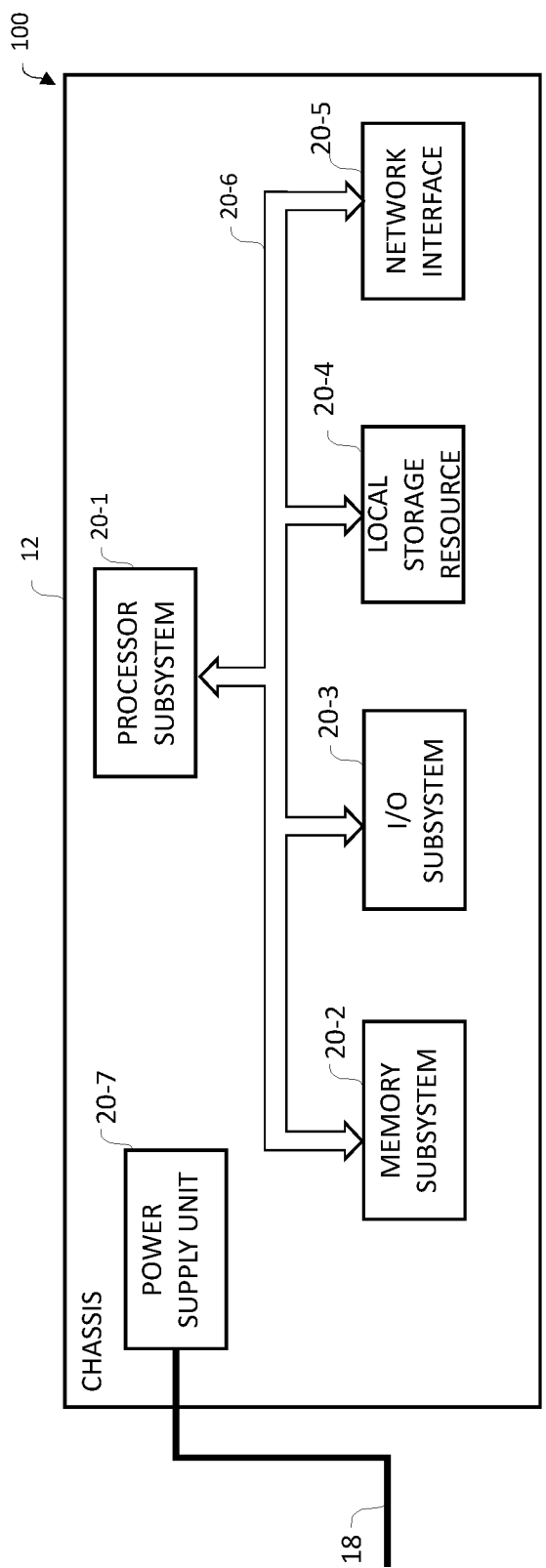
FIG. 1 depicts a block diagram of an information handling system having components including unique components.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, unique component "20-1" refers to an instance of a unique component associated with a processor subsystem and unique component "20-2" refers to an instance of a unique component associated with a memory subsystem, which may be referred to collectively as unique components "20" and any one of which may be referred to generically as unique component "20".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein include a method and system for tracking unique components in information handling systems such that the information handling system can be validated when initially delivered to an end user and any changes to unique components in information handling systems may be tracked over the service life of the information handling system.

Embodiments disclosed herein are described with respect to manufacturing and servicing of information handling systems. Particular embodiments are best understood by reference to FIGS. 1-4, wherein like numbers are used to indicate like and corresponding parts.

Turning to the drawings, FIG. 1 depicts a block diagram of an end user information handling system 10 in a chassis 12. End user information handling system 10 may refer to, for example, a desktop information handling system or a server. Chassis 12 containing end user information handling system 10 may have a service tag 14 that uniquely identifies end user information handling system 10.

Unique Components

As used herein, a unique component 20 may refer to any component in end user information handling system 10 that has a component identifier that corresponds to only that component. For example, power supply unit (PSU) 20-7 installed in chassis 12 may have a label with information including a PSU ID that corresponds only to PSU 20-7 forming part of end user information handling system 10 such that two PSUs 20-7 are distinguishable from each other. By way of contrast, power cord 18 coupled to PSU 20-7 may be a generic component of end user information handling system 10 and have a label with information (e.g., a voltage rating) that an end user or technician might need to ensure PSU 20-7 receives power at the correct voltage, but power cords 18 are generally not distinguishable from other power cords 18 for a similar information handling system. Thus, even though PSU 20-7 and power cord 18 of a first end user information handling system 10 may be swapped with PSU 20-7 or power cord 18 of a second end user information handling system 10, PSU 20-7 for a first end user information handling system 10 may be distinguishable from PSU 20-7 for a second end user information handling system 10.

Unique components 20 of end user information handling system 10 include, but are not limited to, unique components 20-1 of a processor subsystem, unique components 20-2 of a memory subsystem, unique components 20-3 of an I/O subsystem, unique components 20-4 of local storage resources and unique components 20-5 of a network interface, unique components 20-6 of a system bus and power supply unit 20-7, and may include other unique components 20.

Unique components 20-1 of a processor subsystem may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, unique components 20-1 of a processor subsystem may interpret and execute program instructions and process data stored locally (e.g., in a memory subsystem). In the same or alternative embodiments, unique components 20-1 of a processor subsystem may interpret and execute program instructions and process data stored remotely (e.g., in a network storage resource).

Unique components 20-2 of a memory subsystem may include a system, device, or apparatus operable to retain and retrieve program instructions and data for a period of time (e.g., computer-readable media). Unique components 20-2 of a memory subsystem may comprise random access memory (RAM) cards, electrically erasable programmable read-only memory (EEPROM) memory cards, a PCMCIA card, flash memory device, a magnetic storage device, an opto-magnetic storage device, and/or a suitable selection and/or array of volatile or non-volatile memory cards that retains data after power to end user information handling system 10 is powered down.

Unique components 20-3 of an input/output (I/O) subsystem comprise a system, device, or apparatus generally operable to receive and transmit data to or from or within end user information handling system 10. Unique components 20-3 of an I/O subsystem may represent, for example, a variety of communication interfaces, graphics interfaces, video interfaces, user input interfaces, and peripheral interfaces. In various embodiments, unique components 20-3 of an I/O subsystem may be used to support various peripheral devices, such as a touch panel, a display adapter, a keyboard, a touch pad, or a camera, among other examples. In some implementations, unique components 20-3 of an I/O subsystem may support so-called 'plug and play' connectivity to external devices, in which the external devices may be added or removed while end user information handling system 10 is operating.

Unique components 20-4 of a local storage resource comprise computer-readable media (e.g., hard disk drive (HDD), floppy disk drive, CD-ROM, and other type of rotating storage media, flash memory, EEPROM, or another type of solid-state storage media) and may be generally operable to store instructions and data.

Unique components 20-5 of a network interface comprise a suitable system, apparatus, or device operable to serve as an interface between end user information handling system 10 and a network (not shown). Unique components 20-5 of a network interface may enable end user information handling system 10 to communicate over a network using a suitable transmission protocol or standard. In some embodiments, unique components 20-5 of a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to a network interface or various components associated therewith may be implemented using hardware, software, or any combination thereof.

Unique components 20-6 of a system bus comprising any of a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

A manufacturer of information handling systems may have multiple manufacturing facilities, wherein each manufacturing facility may build thousands of chassis 12 containing instances of end user information handling system 10 using components from the same or different component suppliers. Thus, two instances of end user information handling system 10 in the same chassis design may have the same unique component type (e.g., a CPU), but the performance of a first CPU 20-1 supplied by a first CPU supplier may differ slightly than the performance of a second CPU 20-1 supplied by a second CPU supplier.

Unique components 20 installed in end user information handling system 10 may have a serial number or other component identifier that uniquely identifies that unique component 20 from other unique components 20. Embodiments disclosed herein provide secure shipment verification and component tracking for information handling systems 10.

Shipment Component Verification

Figure 2:
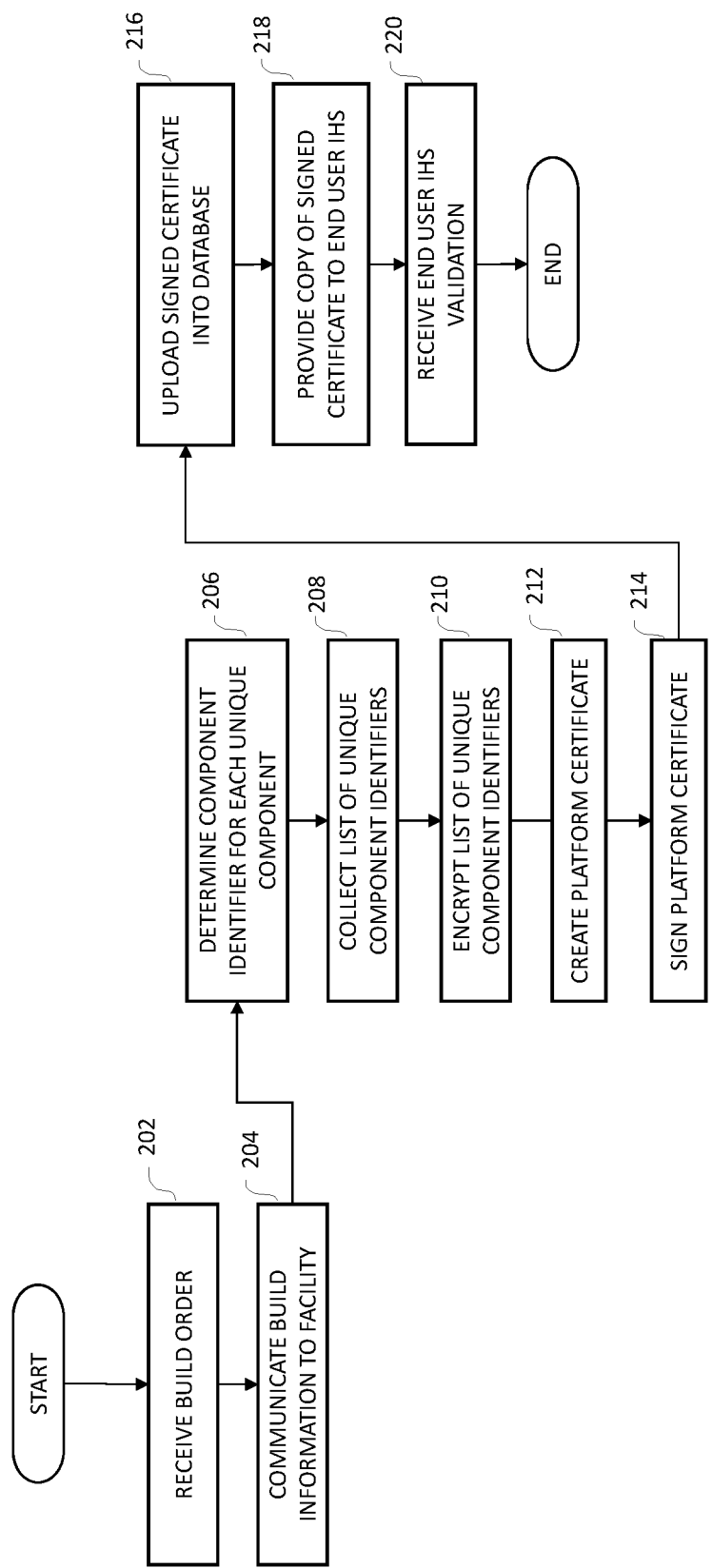
FIG. 2 depicts a flow diagram of a process for verification of the information handling system depicted in FIG. 1 by an end user.

FIG. 2 is a flow diagram of a process of manufacturing and delivering information handling systems 10 to users, including secured shipment verification.

At step 202, an order to build end user information handling system 10 is processed. In some embodiments, a build order may be received from an end user, such as by a user placing an order online. A build order may comprise desired specifications for end user information handling system 10, such as a hard disc drive (HDD) having a minimum memory, a central processing unit (CPU) or graphics processing unit (GPU) having a minimum processing speed, or some other component or operating parameter.

Variations In Unique Components

Many end users do not know (or might not be concerned) which components—including which unique components 20—are installed in end user information handling system 10. For example, a user might specify a memory requirement of 1 TB for a hard disc drive (HDD) and accept any HDD from any vendor that has 1 TB of memory. A manufacturer of end user information handling system 10 may purchase thousands of HDDs from multiple vendors, with each HDD having at least 1 TB of memory. However, variations in relation to power, processing speed, operating temperatures, etc. may occur among HDDs in different batches from the same vendor or different vendors, such that HDDs installed in end user information handling systems 10 may have different specifications, performance and service life. To ensure an information handling system 10 delivered to an end user matches the build order and to protect warranty claims, embodiments track unique components 20 and communicate with an information handling system 10 delivered to the end user to validate that unique components 20 in the delivered information handling system 10 match the unique components 20 in the build order.

At step 204, a build order is communicated to a manufacturing facility. The manufacturing facility may be selected based on proximity to an address to which end user information handling system 10 is to be shipped. A manufacturing facility may receive unique components 20 from multiple vendors, and multiple manufacturing facilities may receive unique components 20 from multiple vendors. Each vendor may provide information such as operating specifications for a unique component. The information may include a voltage or a range of voltages, an operating temperature or a range of operating temperatures, a processing speed or a range of operating speeds, and other operating parameters.

At step 206, as end user information handling system 10 is built, manufacturing facility information handling system 450 determines a component identifier for each unique component 20 corresponding to information handling system 10 being built. Determining a component identifier may include manufacturing facility information handling system 450 scanning a label on each unique component 20 at the step in the manufacturing process in which the unique component is installed in information handling system 10.

At step 208, embodiments of a component tracking system collect information about each unique component 20. In some embodiments, manufacturing facility information handling system 450 records information about each unique component 20 in a data structure corresponding to information handling system 10 being built. The data structure may include a service tag 14 of the information handling system 10 being built and the facility where the information handling system 10 is being built. Information about a unique component 20 may include the unique identifier, a vendor of the unique component 20, a date of manufacture of the unique component 20, one or more operating parameters of the unique component 20 (e.g., voltage requirements, maximum operating temperature and minimum cooling requirements).

At step 210, embodiments of a component tracking system encrypt the data structure. In some embodiments, manufacturing facility information handling system 450 encrypts the data structure.

At step 212, embodiments of a component tracking system creates a secured component verification (SCV) certificate including the encrypted data structure. In some embodiments, manufacturing facility information handling system 450 creates a secured component verification (SCV) certificate, discussed in greater detail below.

At step 214, embodiments of a component tracking system sign the secured component verification (SCV) certificate. In some embodiments, a Hardware Security Module (HSM) may sign the secured component verification (SCV) certificate.

At step 216, embodiments of a component tracking system store the signed secured component verification (SCV) certificate in a repository associated with the certificate authority for the secured component verification (SCV) certificate. In some embodiments, manufacturing facility information handling system 450 communicates with repository information handling system 420 to store a signed secured component verification (SCV) certificate. In some embodiments, a repository may be located at the manufacturing facility. In other embodiments, a repository may be centrally located, such as at a headquarters or engineering facility that designed end user information handling system 10.

At step 218, embodiments of a component tracking system store a copy of the signed secured component verification (SCV) certificate on end user information handling system 10. In some embodiments, manufacturing facility information handling system 450 communicates with store a copy of the signed secured component verification (SCV) certificate in a remote access controller on end user information handling system 10.

Information handling system 10 may be shipped to an end user for installation. When the end user powers on end user information handling system 10, at step 220, embodiments may receive validation from the end user end user information handling system 10. In some embodiments, end user information handling system 10 communicates a copy of the signed secured component verification (SCV) certificate to the repository information handling system 420, which compares the copy of the signed secured component verification (SCV) certificate with the signed secured component verification (SCV) certificate stored in the repository. If the copy of the signed secured component verification (SCV) certificate matches the signed secured component verification (SCV) certificate stored in the repository, embodiments of a component tracking system verify that the end user information handling system 10 delivered to the end user matches end user information handling system 10 built by the manufacturing facility. Verification of end user information handling system 10 may be used subsequently to preserve warranty claims.

Managing Unique Secondary Components

A unique component 20 may need replacement. However, an end user such as a data center may have multiple information handling systems 10, with each end user information handling system 10 having multiple unique components 20 of the same type of unique component 20, and a unique component 20 may have been removed from one end user information handling system 10 and installed in another end user information handling system 10. Embodiments disclosed herein may track installation of unique secondary components relative to end user information handling system 10.

Figure 3:
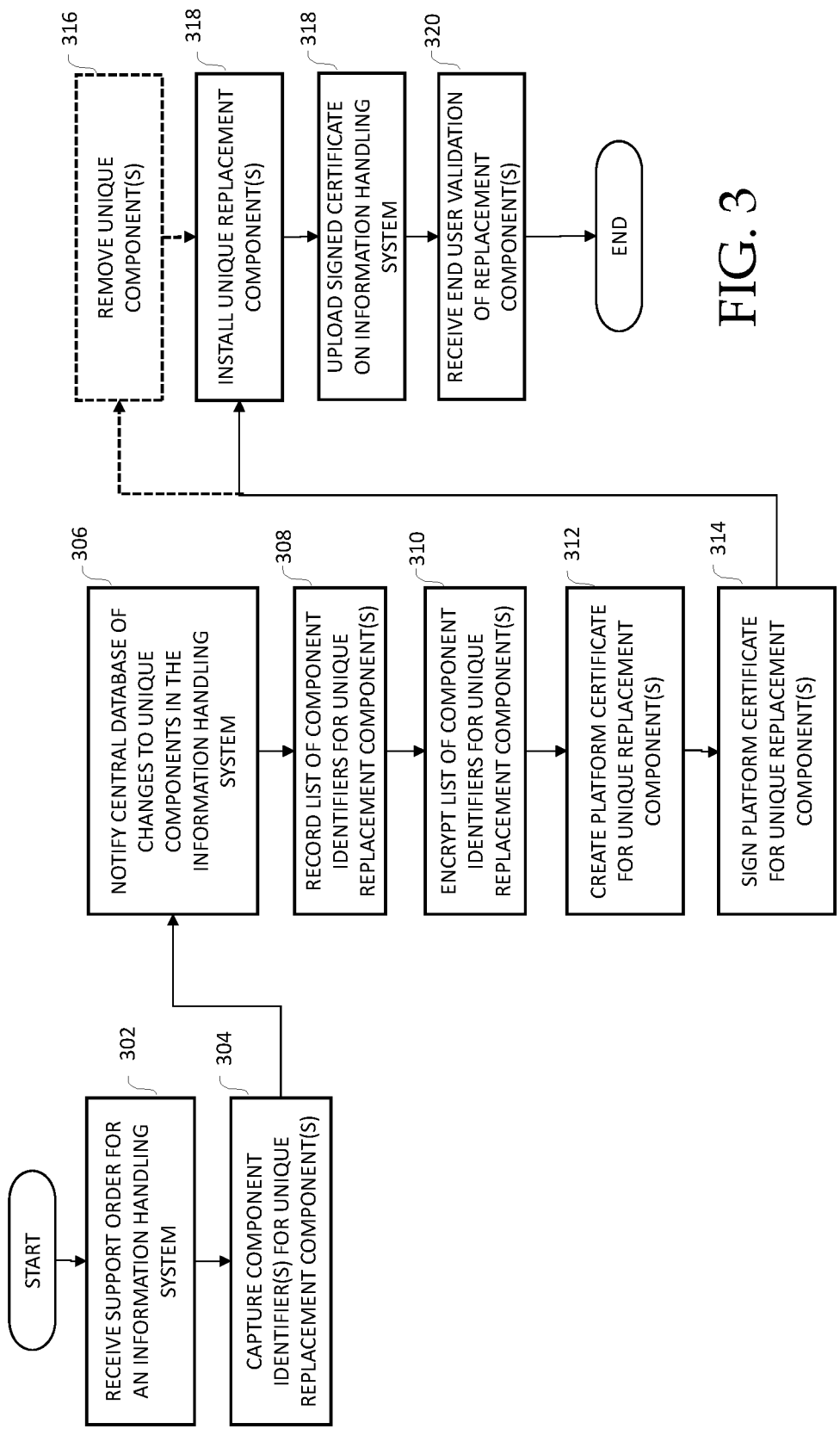
FIG. 3 depicts a flow diagram of a process for unique component tracking for the information handling system depicted in FIG. 1.

FIG. 3 is a flow diagram of a process of verifying a unique component 20 is installed in end user information handling system 10 and maintaining a record of unique components 20 installed in end user information handling system 10.

At step 302, a support order for end user information handling system 10 is received. In some embodiments, a support order may be received from an end user, such as by a person placing an order online or by a technician or other party responsible for servicing end user information handling system 10. A support order may comprise desired specifications for updating a unique component 20 in end user information handling system 10, such as a replacement hard disc drive (HDD) having a larger memory than an HDD originally installed, a replacement central processing unit (CPU) or graphics processing unit (GPU) having a processing speed faster than an originally installed CPU or GPU and a replacement network card. A support order may identify a unique component 20 in end user information handling system 10 that is experiencing problems or needs to be replace.

At step 304, the support order is communicated to a support facility containing unique components 20. The support facility may store unique components 20 and generic components. An enterprise may have multiple support facilities, wherein a support facility may be selected based on proximity to a physical address of end user information handling system 10.

At step 306, embodiments of a component tracking system may communicate with the support facility information handling system 460 and receive an indication of a change to end user information handling system 10 that involves installing and/or removing one or more unique components 20. In some embodiments, a unique component 20 may be shipped directly to an end user and component tracking system may determine the component identifier for the unique component 20, such as by scanning a label of the unique component 20. In some embodiments, a unique component 20 may be sent to a technician for installing in end user information handling system 10, wherein the unique component 20 may be labeled or include instructions identifying a target end user information handling system 10, a unique component 20 to remove from the target end user information handling system 10 and the unique component 20 to be installed in end user information handling system 10.

At step 308, embodiments of component tracking system record information about each unique component 20 to be installed in end user information handling system 10 in a secondary data structure. In some embodiments, component tracking system records information about each unique component 20 to be installed in end user information handling system 10 in a secondary data structure. Information about a unique component 20 to be installed in end user information handling system 10 may include information about a unique component 20 that is being replaced by a unique component 20.

At step 310, embodiments of component tracking system encrypt the data structure containing the component identifiers for unique components 20 to be installed in end user information handling system 10.

At step 312, embodiments of component tracking system create a delta certificate for end user information handling system 10. The delta certificate includes the data structure containing the component identifiers for unique components 20 to be installed in end user information handling system 10.

At step 314, embodiments of component tracking system sign the delta certificate for end user information handling system 10. In some embodiments, a component tracking system communicates with a Hardware Security Module (HSM) to sign the delta certificate.

At step 316, embodiments of component tracking system send a copy of the signed delta certificate to end user information handling system 10 or technician information handling system. In some embodiments, component tracking system sends a copy of the signed delta certificate for saving in a remote access controller on end user information handling system 10.

In some situations, at step 318, unique components 20 may be removed from end user information handling system 10. For example, if a HDD 20-2 develops a problem, step 316 may be performed by a technician to remove the HDD 20-2.

At step 320, one or more unique components 20 are installed. For example, referring to step 318, a technician may install a HDD 20-2 as a unique component 20 to replace the removed HDD 20-2. In other situations, end user information handling system 10 may have the capacity to install a unique component 20 without removing another unique component 20. For example, end user information handling system 10 may be manufactured with four bays for unique components such as memory devices 20-2 but only three memory devices 20-2 are originally installed, wherein a fourth memory device 20-2 may be installed without removing any of the other three memory devices 20-2.

At step 322, embodiments of component tracking system may receive validation from the end user end user information handling system 10. In some embodiments, an end user information handling system 10 may validate the authenticity of unique components 20 using the delta certificate. In some embodiments, a remote access controller may communicate with unique components 20 in end user information handling system 10 to collect information and compare the collected information with information stored in memory in the remote access controller, wherein if the collected information matches the stored information, information handling system verifies that unique components 20 installed in end user information handling system 10 are the same unique components 20 sent by the component facility. Verification of unique components 20 installed in end user information handling system 10 may be used subsequently to preserve warranty claims.

Figure 4:
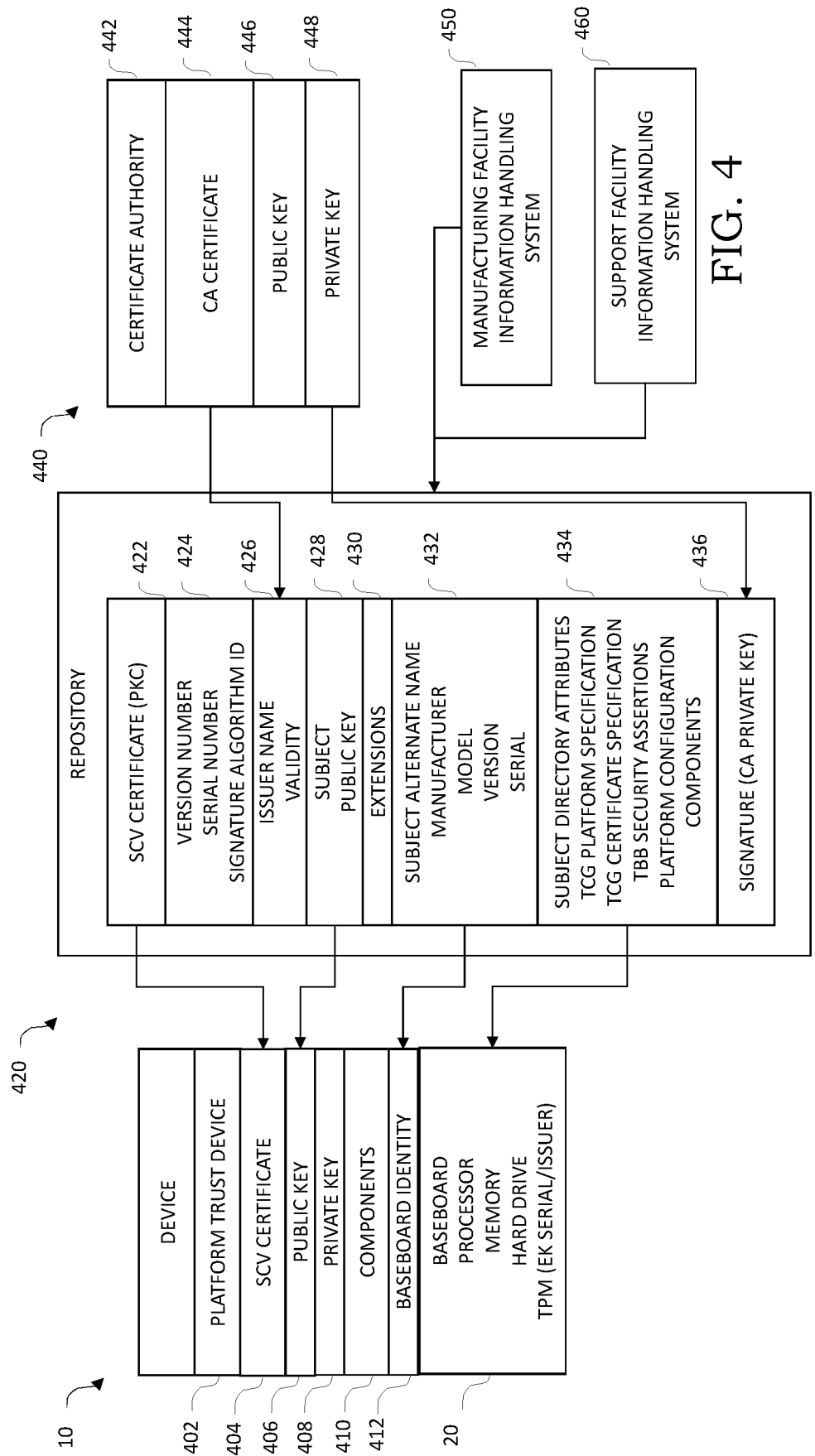
FIG. 4 depicts a portions of a system for tracking changes to unique components in the information handling system depicted in FIG. 1.

FIG. 4 depicts a portion of one embodiment of a component tracking system for unique components 20 in end user information handling system 10.

A component tracking system may comprise repository information handling system 420 storing a secured component verification (SCV) certificate 422 corresponding to end user information handling system 10 having unique components 20 installed therein. Repository information handling system 420 may communicate with manufacturing facility information handling system 450 to collect a component identifier for each unique component 20 installed during manufacture of end user information handling system 10, communicate with support facility information handling system 460 or technician information handling system 470 to collect a component identifier for each unique component 20 to be installed or removed after end user information handling system 10 has been delivered to an end user and communicate with certificate authority (CA) information handling system 440 to get a CA certificate 444 and private key 448 for signing secured component verification (SCV) certificate 422.

SCV certificate 422 may have a structure based on a Trusted Computing Group (TCG) platform specification. SCV certificate 422 may be based on a standard such as X.509 standard.

SCV certificate 422 may include certificate information 424 such as a version number, a serial number and a signature algorithm identifier (ID).

SCV certificate 422 may include certificate issuer information 426 such as issuer information for a certificate authority corresponding to CA information handling system 440. Repository information handling system 420 may communicate with certificate authority (CA) information handling system 440 to get certificate authority (CA) certificate 444 for validating end user information handling system 10. SCV certificate 422 may include certificate authority (CA) information 430 such as an issuer name and validity of the certificate authority and includes CA signature 436 corresponding to CA private key 448.

SCV certificate 422 may include extensions 430. One extension 430-1 may be an alternate name for baseboard identity 412. For example, an alternate name for a baseboard identity 412 may specify a manufacturer, model name, version number or serial number for a baseboard controller associated with baseboard identity 412.

Other extensions 430 may comprise subject directory attributes 430-2 that can be bound to multiple identities. For example, extensions 430-2 may include subject directory attributes that are bound to identities of unique components 20.

As depicted in FIG. 4, end user information handling system 10 comprises platform trust device 412. Platform trust device 412 may be a remote access controller with memory storing SCV certificate copy 404 of secured component verification (SCV) certificate 422 rooted to a key pair comprising public key 406 and private key 408. End user information handling system 10 comprises unique components 20 such as a baseboard, processor, memory, hard drive and trusted platform module (TPM). End user information handling system 10 may store information about components 20, including baseboard controller identity 422, in a remote access controller and communicate the information to repository 420 for including in secured component verification (SCV) certificate 422.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for verification of unique components installed in an end user information handling system, the method comprising:
collecting a component identifier for each unique component installed in the end user information handling system;
recording each component identifier for each unique component in a data structure, the data structure further comprising an information handling system identifier;
encrypting the data structure;
creating a secured component verification (SCV) certificate including the encrypted data structure;
signing the SCV certificate;
storing the signed SCV certificate in a repository;
saving a copy of the signed SCV certificate on the end user information handling system; and
verifying unique components installed in the end user information handling system matches unique components installed in the end user information handling system, wherein verifying comprises:
the end user information handling system communicating the saved copy of the signed SCV certificate to the repository;
the repository determining the signed SCV certificate received from the end user information handling system matches the copy of the signed SCV certificate stored in the repository;
determining that a particular component of the unique components installed in the end user information handling system has been removed, and in response:
identifying a particular component identifier of the particular component;
identifying a new component installed at the end user information handling system;
identifying a new component identifier of the new component; and
generating a delta certificate indicating the particular component identifier and the new component identifier.

2. The method of claim 1, wherein the saved copy of the signed SCV certificate is stored in a remote access controller in the end user information handling system.

3. The method of claim 1, wherein collecting a component identifier for each unique component installed in the end user information handling system comprises scanning a label on each unique component at a step in the manufacturing process in which the unique component is installed.

4. The method of claim 1, wherein the data structure comprises an information handling system identifier corresponding to the end user information handling system in which the unique component is installed.

5. The method of claim 1, wherein the SCV certificate comprises an X.509 certificate.

6. The method of claim 1, wherein creating a delta certificate further comprises:
a support facility information handling system:
collecting a component identifier for each unique component to be installed in the end user information handling system; and
recording the component identifier for each unique component in a secondary data structure;
the repository information handling system:
receiving the secondary data structure;
encrypting the secondary data structure;
creating a delta certificate including the encrypted secondary data structure;
signing the delta certificate;
storing the signed delta certificate;
communicating a copy of the signed delta certificate to the end user information handling system.

7. The method of claim 1, wherein creating a delta certificate when a unique component is installed or removed from the end user information handling system comprises:
a technician information handling system:
collecting a component identifier for each unique component to be installed in the end user information handling system;
collecting a component identifier for each unique component to be removed from the end user information handling system; and
recording the component identifier for each unique component to be installed or removed in a secondary data structure;
the repository information handling system:
receiving the secondary data structure;
encrypting the secondary data structure;
creating a delta certificate including the encrypted secondary data structure;
signing the delta certificate;
storing the signed delta certificate;
communicating a copy of the signed delta certificate to the end user information handling system.

8. A system for verification of unique components installed in an end user information handling system, the system comprising:
a processor;
a memory; and
a manufacturing facility information handling system for collecting a component identifier for each unique component installed in the end user information handling system and recording each component identifier for each unique component in a data structure, the data structure further comprising an information handling system identifier for the end user information handling system;
a repository information handling system for:
receiving the data structure from the manufacturing facility information handling system;
encrypting the data structure;
creating a secured component verification (SCV) certificate including the encrypted data structure;
signing the SCV certificate;
storing the signed SCV certificate;
communicating a copy of the signed SCV certificate to the end user information handling system before the end user information handling system is delivered;
communicating with the end user information handling system to get the saved copy of the signed SCV certificate;
determining the saved copy of the signed SCV certificate received from the end user information handling system matches the copy of the signed SCV certificate stored in the repository;
determining a particular component of the unique components installed in the end user information handling system has been removed, and in response:
identifying a particular component identifier of the particular component;
identifying a new component installed at the end user information handling system;

identifying a new component identifier of the new component; and generating a delta certificate indicating the particular component identifier and the new component identifier.

9. The system of claim 8, wherein the saved copy of the signed SCV certificate is stored in a remote access controller in the end user information handling system.

10. The system of claim 8, wherein the manufacturing facility information handling system comprises a scanner for collecting a component identifier for each unique component installed in the end user information handling system, wherein the scanner scans a label on each unique component at a step in the manufacturing process in which the unique component is installed.

11. The system of claim 8, wherein the data structure comprises an end user information handling system identifier corresponding to the end user information handling system in which the unique component is installed.

12. The system of claim 8, wherein the SCV certificate comprises an X.509 certificate.

13. The system of claim 8, further comprising a support facility information handling system for collecting a component identifier for each unique component to be installed in the end user information handling system and recording the component identifier for each unique component in a secondary data structure, wherein the repository information handling system:
    receives the secondary data structure;
    encrypts the secondary data structure;
    creates a delta certificate including the encrypted secondary data structure;
    signs the delta certificate;
    stores the signed delta certificate; and
    communicates a copy of the signed delta certificate to the end user information handling system.

14. The system of claim 8, further comprising a technician information handling system for collecting a component identifier for each unique component to be installed in the end user information handling system, collecting a component identifier for each unique component to be removed from the end user information handling system, and recording the component identifier for each unique component to be installed or removed in a secondary data structure, wherein the repository information handling system:
receives the secondary data structure;
encrypts the secondary data structure;
creates a delta certificate including the encrypted secondary data structure;
signs the delta certificate;
stores the signed delta certificate; and
communicates a copy of the signed delta certificate to the end user information handling system.

\* \* \* \* \*